United States Patent [19]

Miyate

[11] Patent Number: 4,890,589
[45] Date of Patent: Jan. 2, 1990

[54] VARIABLE CAPACITY TYPE RECIPROCATING PISTON DEVICE

[75] Inventor: Hiroo Miyate, Kanagawa, Japan

[73] Assignee: Nissan Shatai Company, Limited, Kanagawa, Japan

[21] Appl. No.: 244,840

[22] Filed: Sep. 14, 1988

[30] Foreign Application Priority Data

Sep. 18, 1987 [JP] Japan .................................. 62-234026

[51] Int. Cl.$^4$ .......................... F01L 1/02; F02B 75/32
[52] U.S. Cl. ................................ 123/197 R; 123/90.15
[58] Field of Search ..... 123/197 R, 197 AB, 197 AC, 123/197 C, 192 R, 192 B, 90.15, 90.31, 90.27

[56] References Cited

U.S. PATENT DOCUMENTS

| | | | |
|---|---|---|---|
| 3,496,918 | 2/1970 | Finlay ................................ | 123/90.15 |
| 3,888,217 | 6/1975 | Hisserich .......................... | 123/90.15 |
| 4,440,123 | 4/1984 | Tsai .................................. | 123/192 R |
| 4,480,607 | 11/1984 | Tsai et al. ........................ | 123/192 B |
| 4,484,543 | 11/1984 | Maxey .............................. | 123/90.15 |
| 4,525,151 | 6/1985 | Tomita et al. ................... | 123/90.15 |
| 4,576,127 | 3/1986 | Doi et al. ......................... | 123/90.15 |

FOREIGN PATENT DOCUMENTS 3322769 1/1985 Fed. Rep. of Germany ... 123/192 B

Primary Examiner—David A. Okonsky
Attorney, Agent, or Firm—Bachman & LaPointe

[57] ABSTRACT

The crankshaft of an engine or compressor is arranged to define an Oldham type sliding connection which permits the stroke of a piston or pistons to be selectively varied. When the axis of the control disc is displaced along a arcuate path the TDC position and compression ratio of the device can be varied. Combining four sliding connections in a four square configuration permits inherent vibration cancellation. Valve train timing can be varied using a belt tensioning technique and can be combined with the stroke control provided by the sliding connection arrangement or arrangements.

10 Claims, 12 Drawing Sheets

VARIABLE CAPACITY TYPE RECIPROCATING PISTON DEVICE

BACKGROUND OF THE INVENTION

1. Field of the Invention

The present invention relates generally to reciprocating piston type engines and/or compressors and more specifically to a crank arrangement which permits the stroke of a piston to be selective varied in a manner which varies the displacement or capacity of the device.

2. Description of the Prior Art

In commonly used reciprocating piston engines and compressors each piston is operatively connected with a crankshaft via a connecting rod. In the case of internal combustion engines for example, during the expansion phase, the work done on the piston by the hot expanding combustion gases is transferred to the crankshaft in a manner which induces the rotation thereof.

On the other hand, in the case of compressors, the crankshaft is connected to a source of rotational energy (such as a prime mover or the like) either directly or through a clutch and/or a transmission, and the piston is driven to reciprocate and compress and discharge fluid during the compression phase of the same.

However, in both of these arrangements the connecting rod is connected to the crankshaft via a crankpin the eccentricity of which is fixed with respect to the axis of rotation of the crankshaft. Accordingly, stroke of the piston is not variably adjustable through the crankshaft connection.

This induces the drawbacks that, in internal combustion engines, during low load operation for example, it is necessary to throttle the induction passage of the engine in a manner to limit the output of the engine. This causes the formation of a relatively high vacuum in the induction conduit downstream of the throttle valve and induces the so called pumping loss phenomenon. This, as is well known, deteriorates the efficiency and fuel consumption characteristics of the engine.

On the other hand, in the case of compressors, when it is required to reduce the output it is normally necessary to either apply the rotational power to the crankshaft in an ON/OFF manner (e.g. open and close a clutch) or vary the rotational speed through the use of a change speed transmission. This adds to the cost, weigth and complexity of the system.

SUMMARY OF THE INVENTION

It is an object of the present invention to provide a simple crankshaft arrangement which can selectively vary the stroke of the piston or pistons of an engine (or compressor) and thus enable the displacement of the device to be variably controlled.

It is a further object of the present invention to provide a crank arrangement of the above mentioned characteristics which can be readily applied to multi-cylinder internal combustion engines and compressors and which provides an inherent balancing arrangement which reduces vibration and noise.

A further object is to provide an arrangement which can vary the valve train timing and/or ignition timing and the like timing of an engine in response to the change in stroke of the piston or pistons.

In brief, the above objects are achieved by arrangements wherein the crankshaft of an engine or compressor is arranged to define an Oldham type sliding connection which permits the stroke of a piston or pistons to be selectively varied. When the axis of the control disc is displaced along a arcuate path the TDC position and compression ratio of the device can be varied. Combining four sliding connections in a four square configuration permits inherent vibration cancellation. Valve train timing can be varied using a belt tensioning technique and can be combined with the stroke control provided by the sliding connection arrangment or arrangements.

More specifically, a first aspect of the present invention is deemed to come in the form of a device which features: a first piston, said first piston being reciprocatively disposed in a first cylinder; a first connecting rod, said first connecting rod being connected at a first end thereof to said first piston; a first drive disc, said first drive disc being connected to a first drive shaft for synchronous rotation therewith; means defining a guide slot in said first drive disc which slot extends diametrically across a face of said first drive disc; a first control disc, said first control disc being connected with a first control shaft for synchronous rotation therewith; means defining a guide slot in said first control disc which guide slot extends diametrically across a face of said second disc; a first slider, said first slider being slidably received in the guide slot formed in said first drive disc; a second slider, said second slider being slidably received in the guide slot formed in said first control disc; a first pin, said first pin being operatively connected to a second end of said first connecting rod and fixedly connected to said first and second sliders, said first and second sliders being connected to the axial ends of said first pin and arranged to extend in first and second directions, said first and second directions being arranged at right angles with respect to one and other; and a control device, said control device being operatively connected with said control shaft in a manner which enables the axis of rotation of said first control disc to be selectively displaced with respect to the axis of rotation of said first drive disc.

A further aspect of the invention is deemed to come in the form of the above device wherein said first piston defines a first variable volume chamber in said first cylinder, and which further features: valve means for controlling fluid communication between said first variable volume chamber and a passage associated with said cylinder, said valve means comprising: a cam shaft, said cam shaft having a pulley disposed thereon for synchronous rotation therewith; a drive pulley, said drive pulley being disposed on said first drive shaft for synchronous rotation therewith; a flexible belt operatively interconnecting said drive pulley and the pulley disposed on said cam shaft, said flexible belt including a predetermined amount of slack; guide rollers means for tensioning said belt in a manner which takes up said slack and establishes a drive connection between the two pulleys, said guide roller means being movable and operatively connected to said control device in manner to be displaced with respect to said drive pulley and the pulley disposed on said cam shaft, in a manner which causes the cam shaft to undergo a change in angular position and change the timing of said valve means.

Another aspect of the present invention is deemed to comprise an arrangement wherein first, second third and fourth cylinders are arranged in a rectangular configuration and wherein each of the pistons of the four cylinders are connected though sliding connections of the type mentioned above, and which features the arrangement wherein first and second and third and fourth drive shafts are aligned and arranged parallel with one and other; and which further comprises: an input/output shaft which is in drive connection with said first, second, third and fourth drive shafts, the arrangement being such that when said first and third piston assume their TDC positions, said second and fourth piston assume their BDC position.

A further aspect of the invention is deemed to comprise a device which features: a first piston, said first piston being reciprocatively disposed in a first cylinder in a manner to define a variable volume changer therein; a connecting rod, said connecting rod having a first end operatively connected to said piston and a second end operatively connected with a crankshaft arrangement; valve means for controlling fluid communication between said variable volume chamber and a passage associated with said cylinder, said valve means comprising: a cam shaft, said cam shaft having a pulley fixedly disposed thereon for synchronous rotation therewith; a drive pulley, said drive pulley being fixedly disposed on said first drive shaft for synchronous rotation therewith; a flexible belt operatively interconnecting said drive pulley and the pulley disposed on said cam shaft, said flexible belt including a predetermined amount of slack; guide rollers means for tensioning said belt in a manner which removes said slack, said guide roller means being movable and operatively connected to a control device in manner to be selectively displaced with respect to said drive pulley and the pulley disposed on said cam shaft, said selective displacement being such as to causes the cam shaft to undergo a change in angular position and change the timing said valve means.

BRIEF DESCRIPTION OF THE DRAWINGS

The merits and advantages of the various embodiments of the present invention will become more clearly appreciated as a detailed description of the same is made with reference to the appended drawings wherein.

DETAILED DESCRIPTION OF THE PREFERRED EMBODIMENTS

Figure 1:
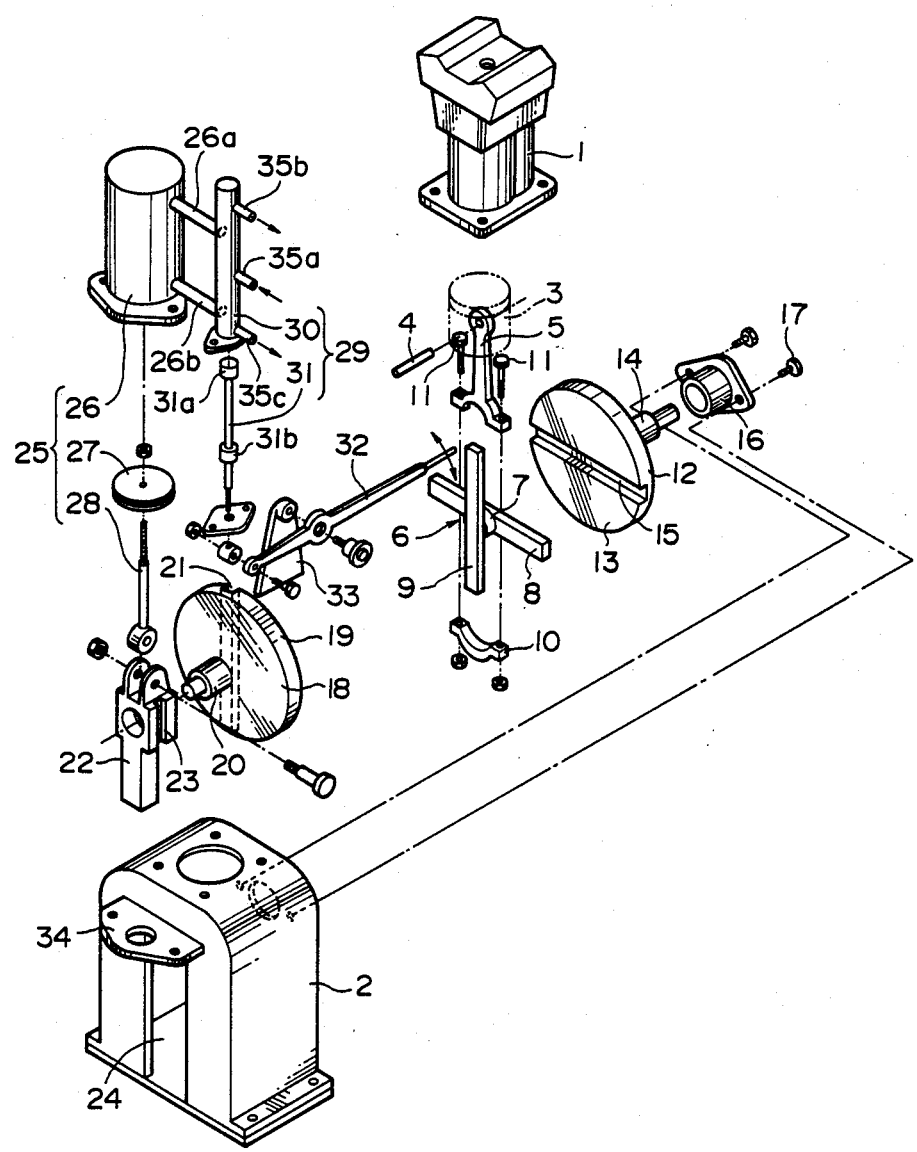
FIG. 1 is an exploded view showing the constructional features of a first embodiment of the present invention.

FIG. 1 shows in exploded view form a first embodiment of the present invention. In this arrangement a cylinder block 1 is mounted on top of a main shaft case 2. The cylinder block 2 is formed with a cylinder bore (not shown) in which a reciprocal piston 3 is disposed. The piston 3 is connected to the upper end of a connecting rod 5 by way of a piston pin 4. The lower end of the connecting rod 5 is connected to a connection arrangement generally denoted by the numeral 6, by way of cap 10 and cap bolts 11.

The connection arrangement 6 comprises a short cylindrical shaft portion 7 and two elongate sliders 8 and 9. As shown, the two sliders 8, 9 are fixedly arranged at right angles to each other and are securely connected to the opposite ends of the cylindrical shaft portion 7.

A first drive disc 12 is formed with a diametrically extending guide slot 15 in the inboard face 13 thereof. As will be appreciated from this figure, this guide slot 15 is arranged to slidably receive slider 8 therein. The first drive disc is fixedly connected to the inboard end of a drive shaft 14. This shaft is rotatably supported by a bearing 16 which is connected to the main shaft case 2 by way of bolts 17.

A second control disc 18 is formed with a diametrically extending guide slot 21 in the inboard face 19 thereof. The guide slot 21 is arranged to receive slider 9 therein.

This second disc 18 is fixedly connected to a coaxial control shaft 20.

In this arrangement the support shaft is journalled in through bore formed in a reciprocal control slide member 22. The reciprocal control member 22 is formed guide grooves 23 in each side thereof. These grooves 23 are arranged to receive the edges of a stationary guide slot 24 formed in the main shaft case 2 in a manner which renders the member 22 slideable in the vertical direction (as seen in the drawings).

The upper end of the control member 22 is connected with a hydraulic servo unit generally dentoted by the numeral 25. This unit 25, as shown, comprises a hydraulic cylinder 26 which is secured to an upper section of the main shaft case 2 by way of a connection flange 34. A control rod 28 is pivotally connected to the upper end of the control member 22 at its lower end and fixedly connected to a piston 27 at its upper end.

A control valve unit generally denoted by the numeral 29 is operatively connected with the hydraulic cylinder 26 via conduits 26a and 26b. This valve unit 29 comprises a valve body 30 in which a spool 31 is reciprocatively disposed. The valve body 30 is formed with an inlet port 35a which is fluidly communicated with a source of hydraulic fluid under pressure (such as an oil pump—not shown). The valve body 30 is further formed with two drain ports 35b and 35c proximate the axial ends thereof.

The spool 31 is formed with two lands 31a and 31b which are arranged to normally locate in a position which block communication between the conduits 26a and 26b and ports 35a, 35b and 35c. Depending on the displacement of the spool 31 from this normal or home position, communication is established between the supply port 35a and one of the conduits 26a and 26b. At the same time the other of the conduits 26a and 26b, is connected with a drain port (viz., one of 35b and 35c). This enables the hydraulic cylinder 26 to be pressurized in a manner which selectively changes the position of the piston 27 therein.

The connection between the piston and the control member 22 is such as to move the latter in the guide slot 24 and thus displace the control disc 18 with respect to the drive disc 12 in a manner which will become more clearly understood hereinlater.

The lower end of the spool 31 is connected with a control lever 32. In this instance the control lever 32 is pivotally mounted on a bracket 33 which is fixedly connected with the main shaft case 2 or an associated stationary member. The control lever 32 can be (directly) operated manually or can be connected to a suitable control servo as the situation demands. Further disclosure relating to this facet of the present invention will be given hereinlater.

Figure 2:
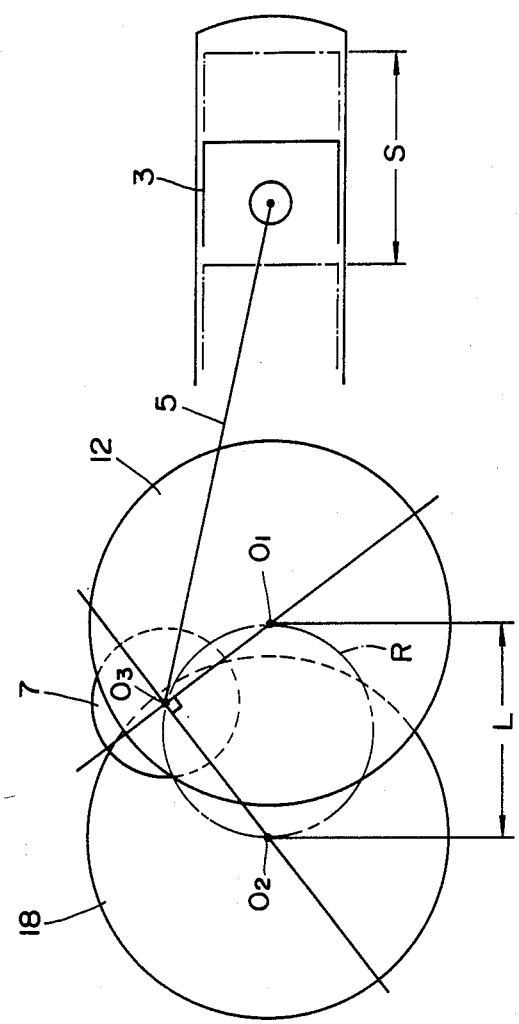
FIG. 2 is a diagrammatic sketch showing the basic geometrical configurations produced in accordance with the first embodiment.

The arrangement disclosed above is such as to define a so called Oldham type sliding coupling or connection arrangement which can be schematically represented in the manner shown in FIG. 2. In this figure O1 denotes the axis of rotation of the first drive disc 12 while O2 denotes the axis of rotation of the second control disc 18 and O3 denotes the axis of rotation of the cylindrical shaft portion 7. Depending on the setting of the control lever 32 and the corresponding conditioning of the control valve unit 29, the axis O2 can be displaced with respect to axis O1 in manner which permits the distance L to be selectively adjusted. As will be appreciated from this figure, axis O3 is located on the diameters along which the first and second guide slots 15 and 21 extend and therefore in a position which traces a circular path the diameter of which is determined by the displacement L of the axes O1 and O2. Viz., as shown with the axes of the discs displaced by the illustrated distance L, the axis about which the lower end of the connecting rod 5 is pivotal (i.e. axis O3) will trace out the circular path R during reciprocation of the piston 3. Of course as the diameter of the circular path R changes so does the stroke S of the piston 3. Hence, it is possible in the case of compressors to change the amount of discharge by moving the axis O2 of the control disc 18, either toward or away from the axis O1 of drive disc 12. On the other hand, in the case of internal combustion engines, during load load operation for example, when a relatively high vacuum prevails in the induction system, by moving the control disc 18 upwardly (as seen in the drawings) the distance between the axes O1 and O2 can reduced in a manner which reduces the diameter of the circular path traced out by the axis O3 and thus reduces the stroke S of the piston 3. Under these conditions, the distance through which the piston moves against the bias produced the pressure differential which develops across the same, is reduced, and the amount of pumping loss which tends to be encountered, accordingly reduced.

With the embodiment disclosed in FIG. 1, order to move the control disc 18 in a manner which changes the distance or displacement L defined between the rotational axes O1, O2 of the two discs 12 and 18, all that is necessary is to move the control lever in the appropriate direction and induce the spool 31 to permit an amount of pressurized hydraulic fluid to be introduced on one side of the piston 27 while permitting a corresponding amount of fluid to be drained from the other side.

Figure 3:
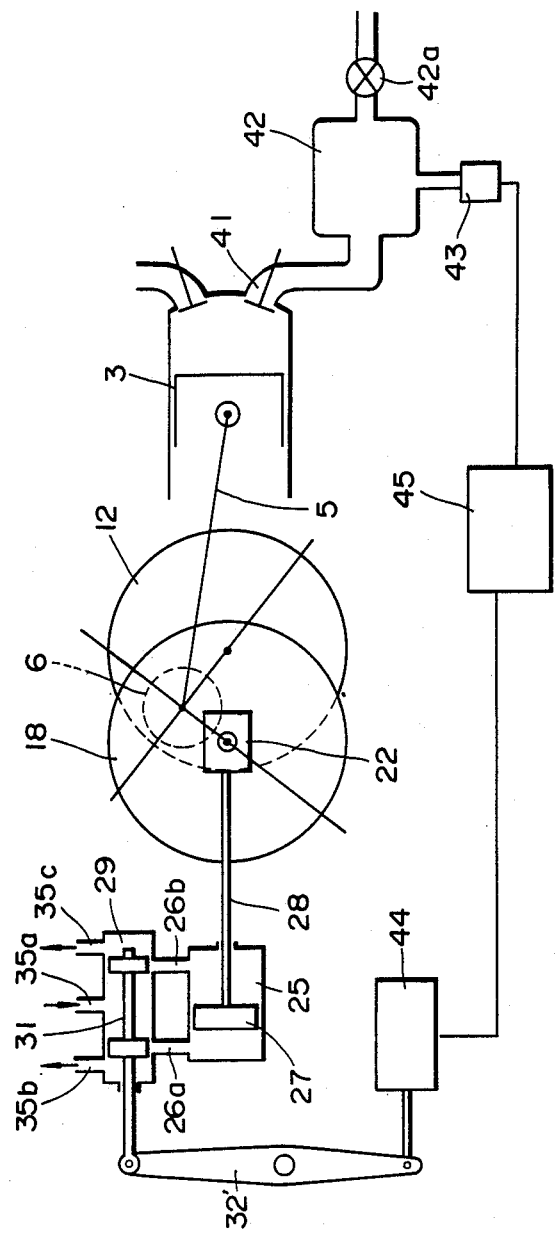
FIG. 3 is a diagrammatic sketch showing an embodiment of the present invention as applied to an internal combustion engine wherein the piston stroke is varied in accordance with the induction pressure (load) of the engine.

FIG. 3 shows a second embodiment of the present invention wherein the manual control, lever arrangement shown in FIG. 1 is replaced with an automatic system which is responsive to the vacuum developed in the induction passage of an internal combustion engine (viz., engine load).

More specifically, in this embodiment a pressure sensor 43 is arranged to sense the pressure prevailing in an induction manifold 42 at location between a throttle valve 42A and an induction port 41. The output of the sensor 43 is applied to a control circuit 45 which is arranged to be responsive to the signal in a manner to produce a suitable control signal. The control signal is applied to a motor arrangement 44. This motor arrangement 44 can take the form of a stepping motor, solenoid, or the like servo (including electrical, hydraulic and pneumatic arrangements) which is connected to the control lever 32'.

As the vacuum is sensed as increasing in a predetermined manner, (e.g. exceeding a predetermined threshold—merely by way of example) the motor 44 is energized or similarly conditioned to move the spool element 31 in a direction which establishes communication between ports 35a and conduit 26a while establishing communication between port 35c and conduit 26b.

This of course establishes a pressure differential which tends to move the piston 27 to the right (as seen in the drawings) and therefore in a direction which reduces the diameter of the circular path R and the strokes of the piston 3.

This embodiment of the invention of course permits automatic control of an engine in response to the load thereon. However, it should be noted that the invention is not limited to the use of induction vacuum to indicate engine load and other suitable parameters can be used as desired. In fact the invention is not limited to the use of engine load and other operational parameters such as transmission status, vehicle speed and the like, can be used as deemed appropriate.

Figure 4:
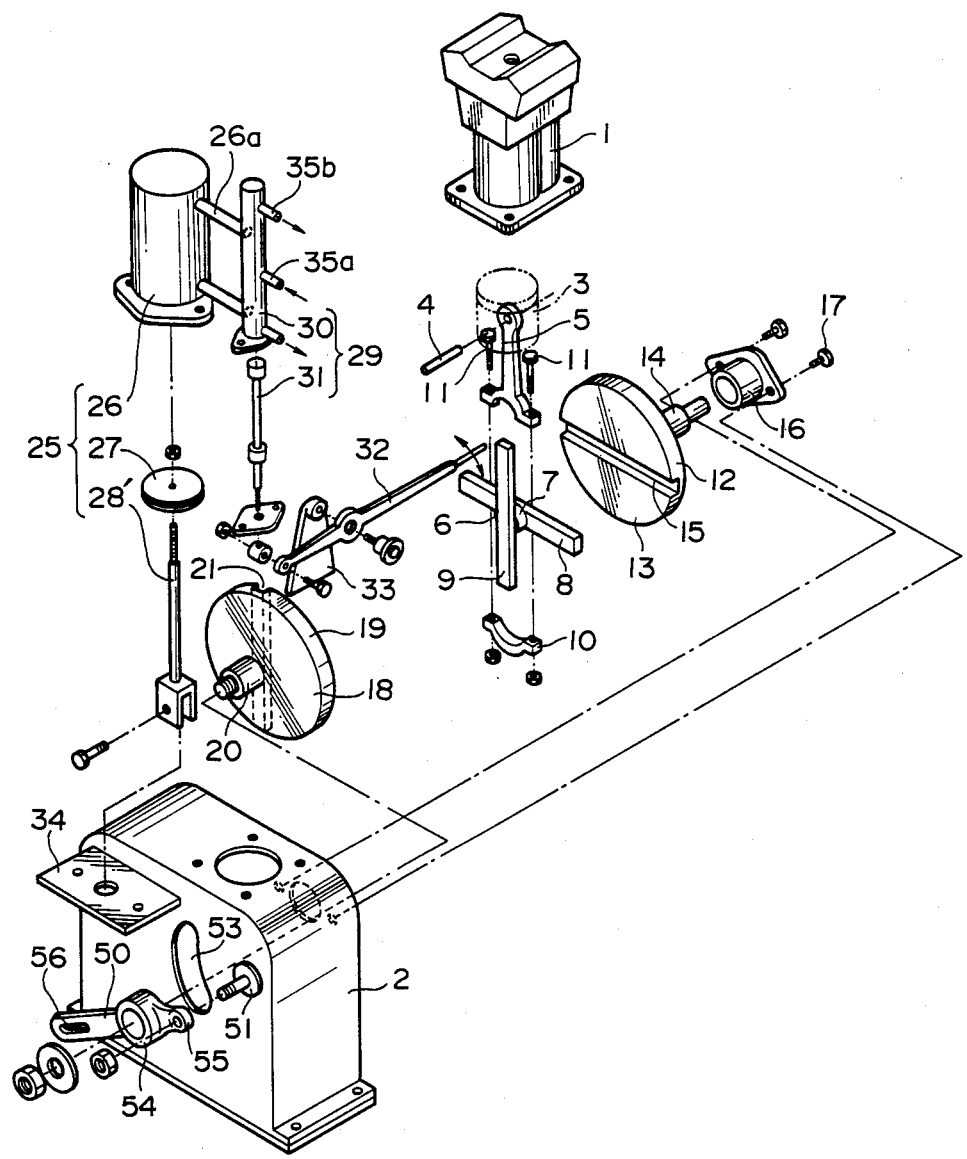
FIG. 4 is an exploded view showing the constructional features according to a third embodiment of the present invention.

FIG. 4 shows a third embodiment of the present invention. This arrangement is basically similar to the arrangement shown in FIG. 1 however features the use of a lever 50 which is pivotally mounted on a pivot pin 51 in place of the sliding control member 22. This lever arrangement enables the rotational axis 2 of the control disc 18 to be moved along a curved path instead of a straight vertical one. Viz., as shown, the shaft 20 of the control disc 18 is arranged to project through an arcuate slot 53 and be received in a bore formed in a circular boss 54 located mid-way between a smaller boss 55 formed at one end of the lever 50 and which is formed with a bore which receives the pivot pin 51; and an elongate slot 56 which serves to establish connection between the lever 50 and the lower end of the control rod 28'.

Figure 5:
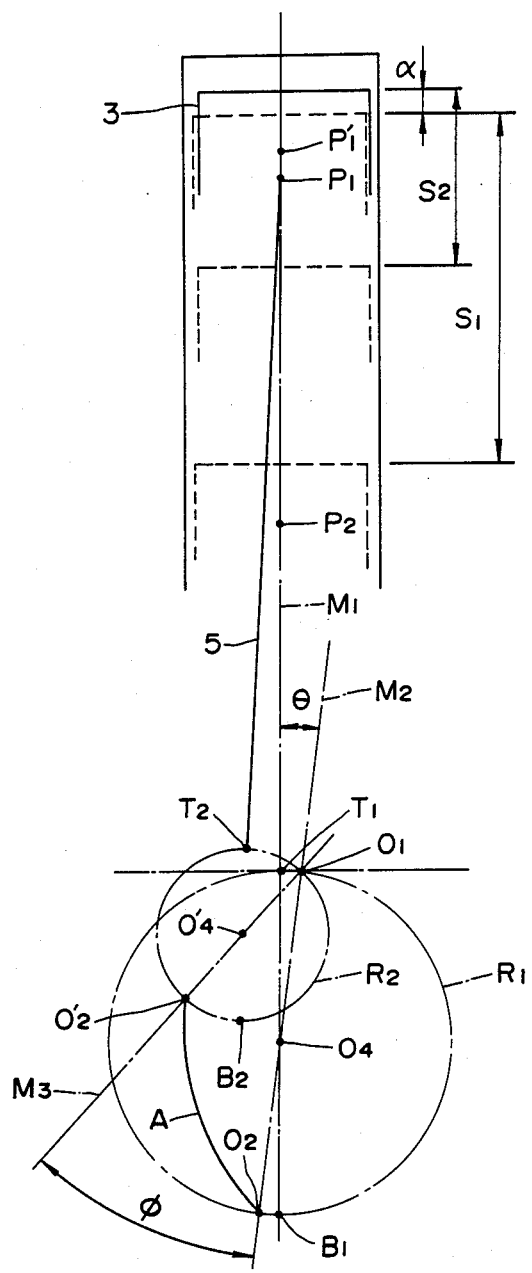
FIG. 5 is a schematic diagram showing the characterizing geometrical features which are produced in accordance with the third embodiment.

As shown in FIG. 5, this enables the system to not only change the length of the piston stroke between a stoke of S1 and S2 but also change the TDC position of the piston (note the distance alpha). Viz., when the stroke is maximized (S1) the piston stops moving upwardly earlier than in the case the stroke is minimized (S2). This of course permits a change in the compression ratio of the system.

In more specific terms, when the hydraulic spool valve 29 is conditioned to move the piston 27 to its lowermost position in the hydraulic cylinder 26, the lever 50 is rotated to a position wherein the axis of rotation of the control disc 18 (viz., O2) is located in a position wherein the axis O3 follows a circular path denoted by R1 and wherein O2 is offset from the axis M1 of the cylinder by an amount indicated by theta—theta being defined between a line M2 which passes through the axis of the circular path R1, and the piston axis M1 (which also intersects O4).

Under these conditions, the resulting stroke of the piston S1 is equal to the diameter of circle R1. When the control disc 18 is moved in a manner which reduces the displacement between the axes O1 and O2, due to the curved path traced out by axis O2 (e.g. O2 moves to O2') the diameter of the circular path traced out by O3 changes from R1 to R2 and is also offset to one side of the cylinder axis M1 in a manner wherein the center of rotation moves from that denoted by O4 to that denoted by O4'. This induces the situation wherein axis O3 with the piston 3 at TDC moves from T1 to T2.

As will be noted from FIG. 5 when the angle phi which is defined between a line M3 which passes through the axes O1 and O2 and which includes the axis O4 about which axis O3 rotates, increases, the stroke S of the piston 3 decreases and the TDC position of the same moves toward the top of the cylinder (i.e. toward the cylinder head). This of course permits displacement of the cylinder to be reduced while varying the compression ratio within a predetermined small range.

Viz., it can be shown that in the event that angle theta is neglected:

$$(approx) = S(1 - \cos \phi)/2 \tag{1}$$

A variant (fourth embodiment) of the above described embodiment comes in the form of an arrangement wherein angle theta is in fact reduced to zero and the axis of rotation O1 of the drive disc 18 is located on the cylinder axis M1. As will be appreciated from the above equation, the results produced by this arrangement are essentially identical with those produced by the former one.

The merits of the above type of control are deemed obvious to those skilled in the automotive engineering art and the like to which the instant invention pertains.

Figure 6:
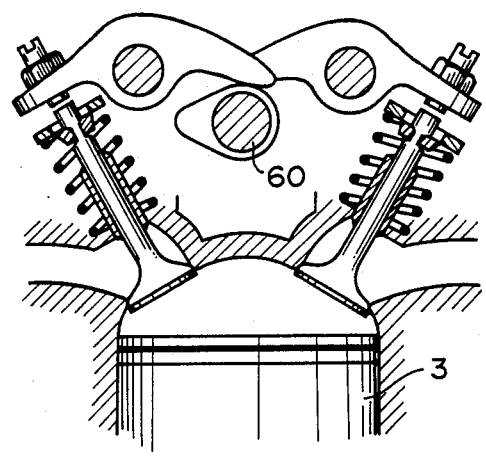
FIG. 6 is a sectional elevation of an internal combustion chamber of the type wherein the inlet and exhaust valves are operated by a single overhead cam shaft arrangement.
Figure 7:
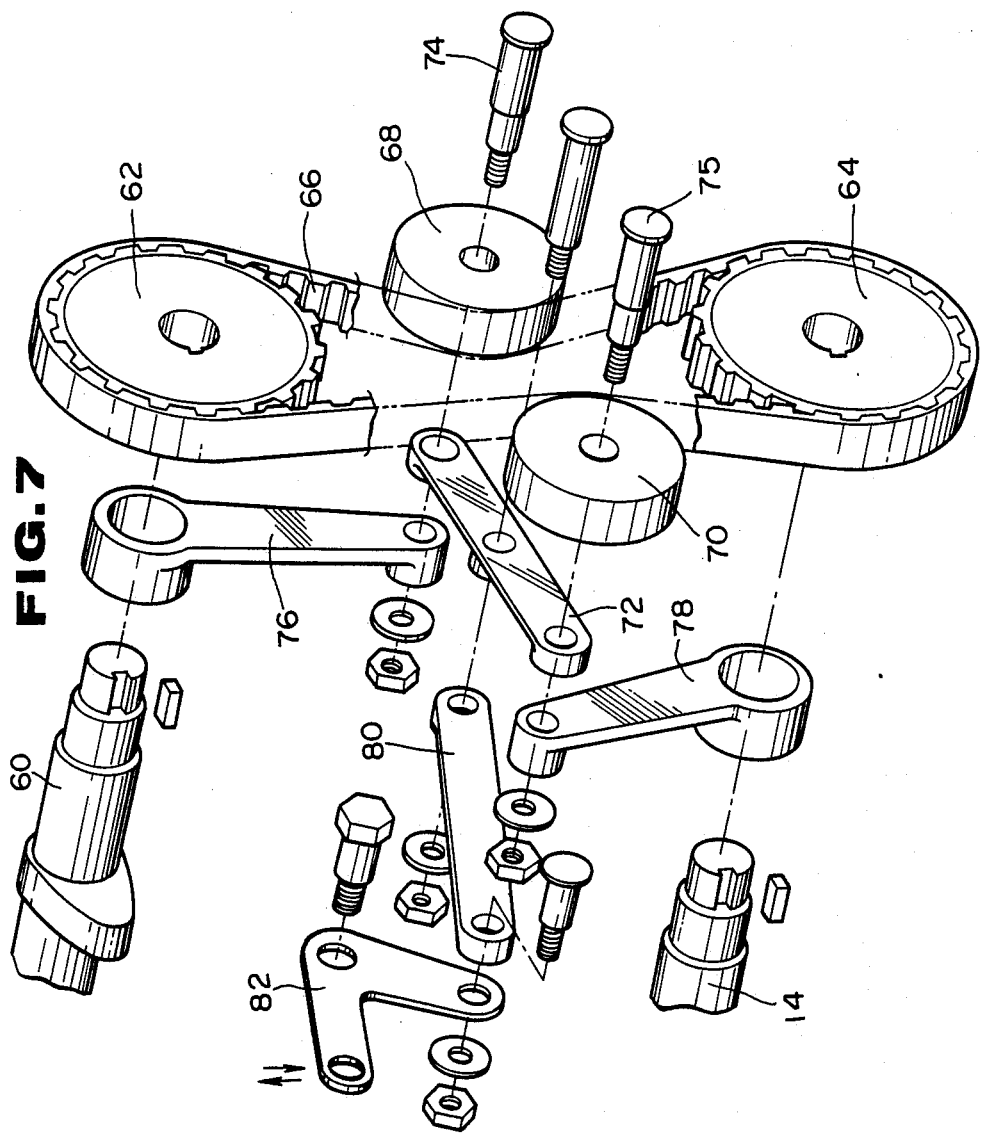
FIG. 7 is a exploded view showing a valve timing control arrangement which characterizes a fourth embodiment of the present invention.

In the case of internal combustion engines it is deemed advantageous to be able to vary the valve train timing of the engine in conjunction with the change in stroke of the piston or pistons thereof. Accordingly, in accordance with a fifth embodiment of the present invention, the cam shaft 60 (see FIG. 6) is provided with a pulley 62 which is operatively connected with a pulley 64 mounted on the drive shaft 14, by way of a cogged timing belt 66. In this arrangement the timing belt 66 is arranged to have a predetermined amount of slack which is taken up by a pair of guide rollers 68, 70. As shown in FIG. 7 these guide rollers or pullies 68, 70 are mounted on a bracket or link 72 by way of stepped shafts 74, 75 which are received in bores formed in the free ends of pivotal levers 76, 78. In this embodiment, the levers 76, 78 are pivotally mounted on the cam shaft 60 and the drive shaft 14, respectively. A connecting bracket 80 is pivotally connected at one end to the center of link 72 and to a bell crank lever 82 at the other. The bell crank lever 82 is pivotally mounted on the main shaft case 2 at its elbow section. The other end of the lever is connected to lever 50 through a suitable (non-illustrated) linkage arrangement.

Figure 8:
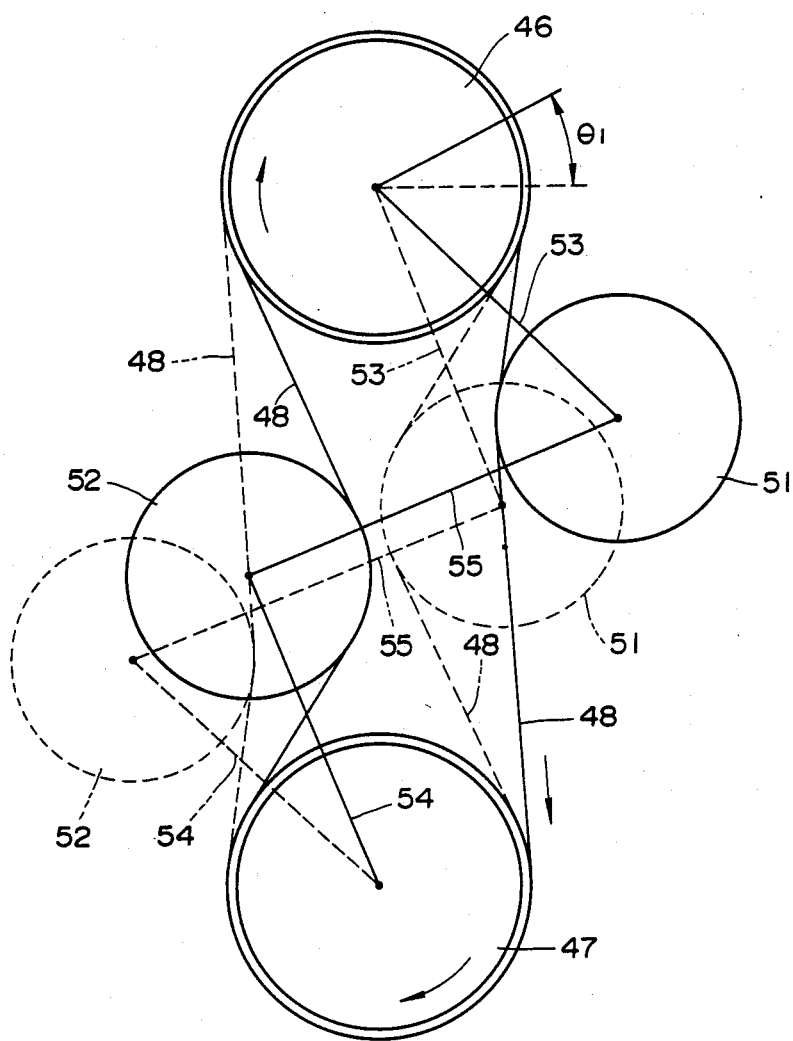
FIG. 8 is a schematic elevational view which shows the operation of the fourth embodiment of the present invention.

Accordingly, when the lever 50 is pivotally moved from one extreme position toward the other under the appropriate hydraulic pressurization of the hydraulic cylinder 26, the bell crank lever 83 is pivotted in a manner which shifts the link 72 from the position shown in FIG. 8 in solid line, to that shown in broken lines. As will be appreciated this movement is such as to move the slack from one side of the arrangement to the other, and in so doing, cause the cam shaft 60 to undergo either a rotational advance or retardation of theta 1. Viz., as the drive shaft and cam shaft pullies are rotating in the clockwise direction given that the link moves from the solid line position to the broken line one, the slack which is taken up on the right hand side of the arrangement (as seen in the drawings) is transferred to the other side (as shown in broken line). Accordingly, the rotation of the cam shaft is advanced by amount indicated by theta 1.

Thus, as will be appreciated with a very simple arrangement the timing of the valve train can be shifted in a timed relationship with the change in piston stroke.

Of course the change in timing is not limited to the valve train timing and can be applied to the ignition timing by substituting (and or including) the cam shaft pulley for one connected to the end of the timing shaft of the ignition arrangement.

FIGS. 9 to 13 show an embodiment of the invention as applied to a multi-cylinder device and which is so arranged as to include an inherent balancing system which neutralizes the vibration which tends to be produced during operation and as the balance of the arrangement changes in accordance with the change in stroke of each piston.

In this embodiment four cylinders #1, #2, #3 and #4 are arranged in a rectangular so called "four square" configuration.

Figure 9:
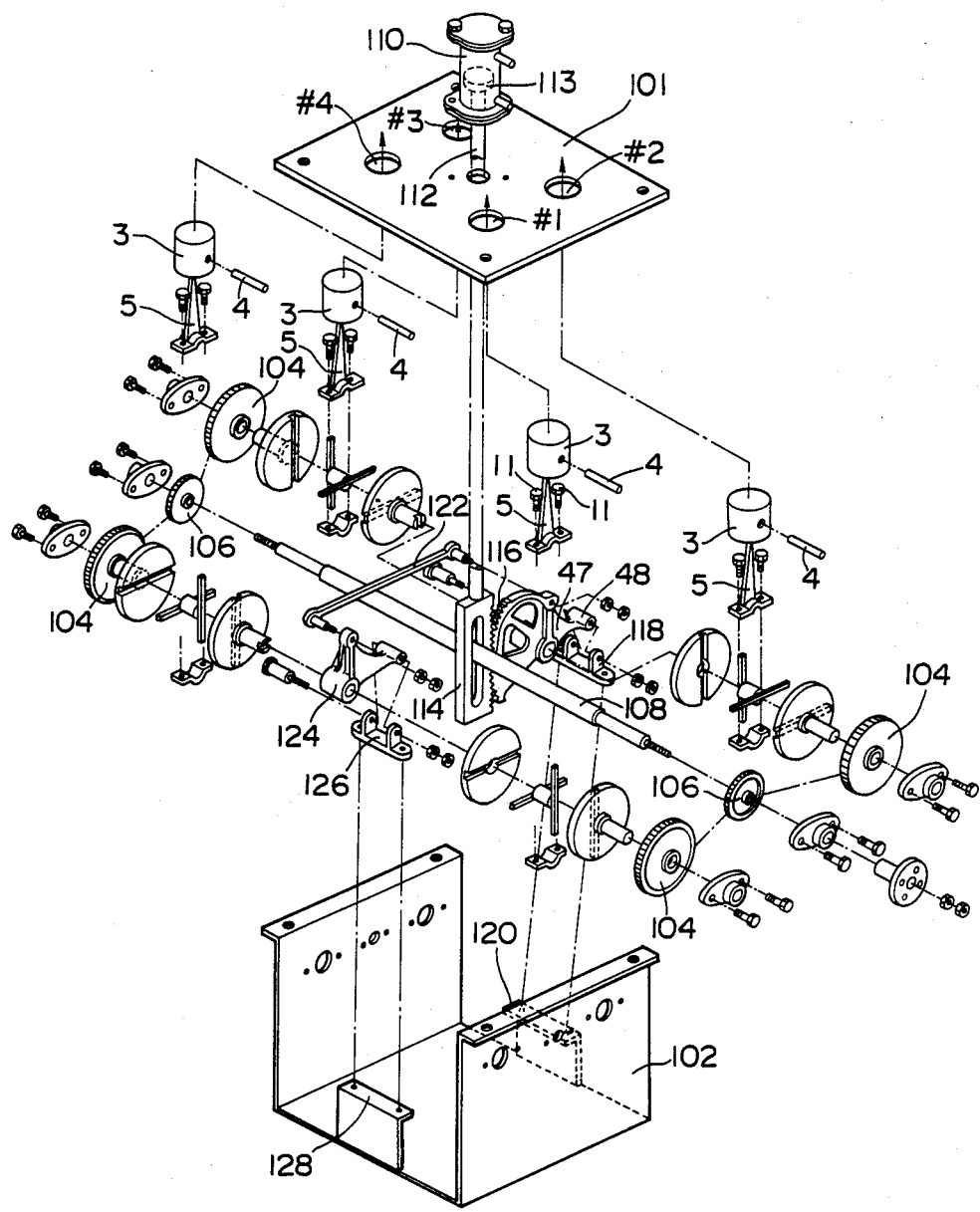
FIG. 9 is an exploded view showing a multi-cylinder arrangement according to a sixth embodiment of the present invention.
Figure 10:
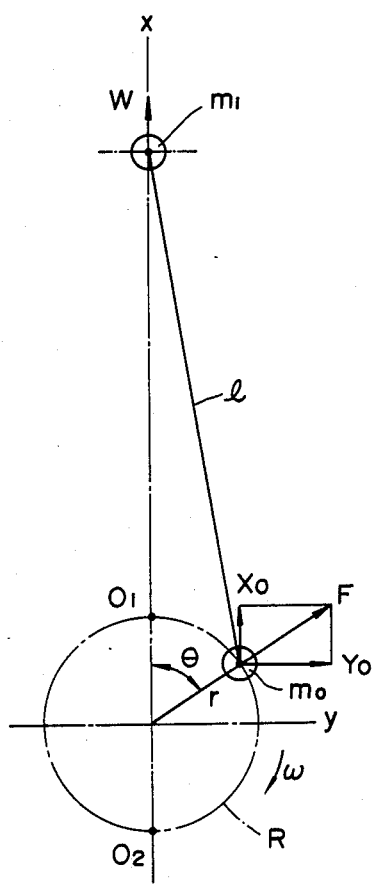
FIG. 10 is a schematic elevational view showing the annular momentum and force generation characteristics produced by a single cylinder of the arrangement shown in FIG. 9.

In FIG. 9 the numeral 101 denotes a top plate which is secured to a crankcase 102 and which supports an unillustrated cylinder block thereon. The crank case 102 is arranged to support two parallel crank shaft arrangements each of which includes two pairs of control and drive discs of the nature described hereinbefore (note that for simplicity of illustration the numerals of these elements have been omitted). In this instance the control discs are arranged in a back to back configuration in an inboard location while the drive discs are arranged at the outboard ends of the crankshafts. The drive shafts of the four drive discs are provided with gears 104 which are arranged to mesh with gears 106 fixed to an input/output shaft 108.

In the case of a compressor the so called input/output shaft 108 acts as an input shaft which supplies drive torque to the pistons, while in the case of an internal combustion engine or the like the shaft acts as an output shaft.

The displacement of the control discs is controlled by a single hydraulic cylinder 110 which is in this instance mounted atop of the top plate 101. As a variant of this arrangement the cylinder can be formed integrally in the cylinder block if so desired.

The control rod 112 which depends from the piston 113 reciprocatively disposed in the hydraulic cylinder 110, is connected to a rack 114. In this arrangement, in order to render the overall arrangement compact and permit the input/output shaft 108 to pass from one end of the crank case 102 to the other, the rack 114 is formed with an elongate slot therein. A sector gear 116 is arranged to mesh with the rack 114 in the illustrated manner. This sector gear 116 is pivotally mounted on a bracket 118 which is secured to a mounting bracket 120 forming part of the crankcase 102. A linkage 122 operatively interconnects the sector gear 116 with a second pivotal arm 124 which is pivotally supported on a bracket 126. This bracket 126 is secured to a second mounting bracket 128.

The sector gear 116 and the pivotal arm 124 are provided with bores which receive shafts which each support two control discs (one on each end). With this arrangement when the hydraulic piston 113 is moved, the control discs are synchronously moved in the same direction and thus cause the stroke of each of the four pistons to synchronously change.

In order to achieve a balancing effect between the four cylinders the pistons of cylinders #1 & #4 and #2 & #3 are arranged so that when one of the pistons is at TDC the other is located at BDC. The reason for this will become apparent from the following discussion made with reference to FIGS. 10 to 13.

Assume for discussion purposes that the reciprocating mass is denoted by m1—viz., the mass of the piston, piston pin, connecting rod piston rings and the like; while the rotating mass is denoted by m0. In this case m0 represents mass of the big end of the connecting rod and other elements which rotate in synchronism therewith.

The inertial force W which is produced by the reciprocating mass m1 is given by the following approximation $$W = m1r^2 (\cos \theta + r/\chi \cos 2\theta) \quad (1)$$

in this equation $\chi$ denotes the length of the connecting rod while r represents the radius of the circular path R (see FIG. 10) about which the center of mass m0 rotates.

The inertial force F which is produced by the rotating mass m0 is given by:

$$F = m0r^2 \quad (3)$$

given that x and y represent mutually perpendicular axes it can be shown that the components of force F which act therealong are given by:

$$Xo = m0r^2 \cos \theta \quad (4)$$

and $$Yo = m0r^2 \sin \theta \quad (5)$$

Figure 11:
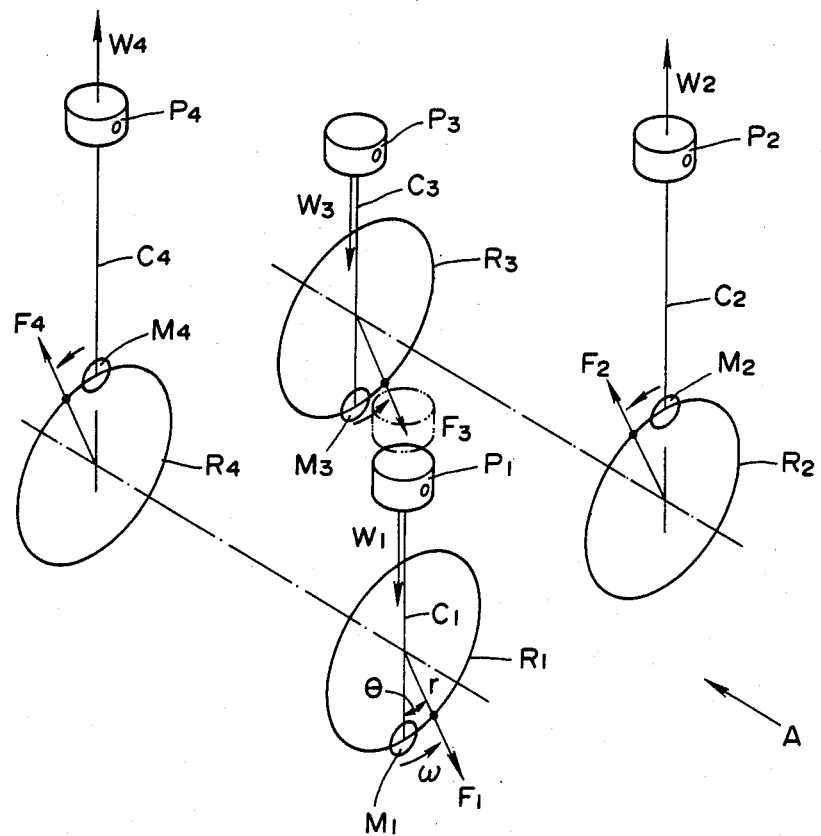
FIG. 11 is a schematic perspective view showing the balancing concept utilized in the sixth embodiment of the present invention.
Figure 12:
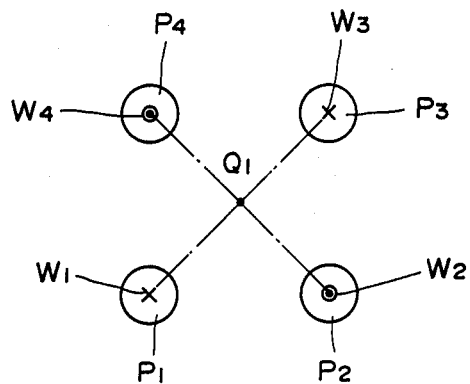
FIGS. 12 and 13 are plan and elevational views showing important relationships developed in connection with the sixth embodiment.

Turning now to FIG. 11, it will be noted that the instant system is schematically expressed in a manner wherein P1–P4 denote each of the pistons; C1–C4 denote each of the corresponding connecting rods; M1–M4 denote the corresponding masses of the connection arrangements; and R1–R4 denote the radii about which the masses M1–M4 rotate.

In this figure the pistons P1 and P3 of cylinders #1 and #3 are shown as assuming their BDC positions while the pistons P2 and P4 are shown assuming their TDC positions. The intertial forces W1–W4 of each of the pistons, under these conditions, act in the direction indicated by the respective arrows. The magnitudes of each of the W values can be derived using the above mentioned equation (2) given the instant values of r and w. As will be noted the direction in the W forces are acting in the case of pistons P1 & P4 and P2 and P3 are reversed. Further, as will be noted from FIG. 12, the direction in which the force W in the case of each pair of diagonally located cylinders is the same. Viz., the forces W2 and W4 are acting upwardly, while the force W1 and W4 are acting the opposite direction. Accordingly, the point Q1 (as seen in plan view) which is located mid-way between each of the cylinders, is such as to be subject to forces which negate one and other.

If we now assume that the crankshafts rotate in a manner wherein each of M1–M4 rotate through the same amount (e.g. angle theta) the rotational inertial forces R1–F4 are produced in a manner wherein F1 & F2 act and F3 & F4 in mutually opposite directions and thus negate each other.

Figure 13:
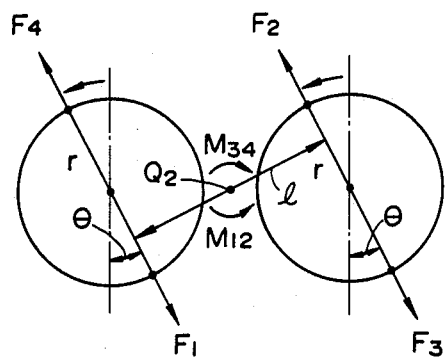

Observing the system in the direction of arrow A in FIG. 11 we obtain an elevational view of the nature shown in FIG. 13.

From this figure it is clear that two rotational moments M12 and M34 tend to be established which act about a point Q2. However, as will be noted, these moments act in opposite directions and thus cancel one and other.

Accordingly, with this arrangement, irrespective of the length of the piston stroke, mutual cancellation of various imbalances which tend to occur during the operation of the device takes place without the need of special balancing weights and the like and whereby the levels of vibration and noise which are produced are extremely low.

What is claimed is:

1. In a device
    a first piston, said first piston being reciprocatively disposed in a first cylinder;
    a first connecting rod, said first connecting rod being connected at a first end thereof to said first piston;
    a first drive disc, said first drive disc being connected to a first drive shaft for synchronous rotation therewith;
    means defining a guide slot in said first drive disc which slot extends diametrically across a face of said first drive disc;
    a first control disc, said first control disc being connected with a first control shaft for synchronous rotation therewith;
    means defining a guide slot in said first control disc which guide slot extends diametrically across a face of said second disc;
    a first slider, said first slider being slidably received in the guide slot formed in said first drive disc;
    a second slider, said second slider being slidably received in the guide slot formed in said first control disc;
    a first pin, said first pin being operatively connected to a second end of said first connecting rod and fixedly connected to said first and second sliders, said first and second sliders being connected to the axial ends of said first pin and arranged to extend in first and second directions, said first and second directions being arranged at right angles with respect to one and other; and a control device, said control device being operatively connected with said control shaft in a manner which enables the axis of rotation of said first control disc to be selectively displaced with respect to the axis of rotation of said first drive disc.

2. A device as claimed in claim 1 wherein said control device comprises:

a hydraulic cylinder in which a control piston is reciprocatively disposed;

a control member, said control member being operatively connected to said control piston in manner to be moved along a predetermined path, said control member rotatably supporting said first control shaft in a manner wherein, when said piston moves said control member along said predetermined path, said control shaft is moved synchronously therewith;

a valve for controlling the supply of hydraulic fluid to said hydraulic cylinder;

lever means operatively connected with said valve for selectively conditioning said valve to supply hydraulic fluid to said hydraulic cylinder in accordance with a predetermined control signal indicative of the required displacement between the rotational axes of said first drive disc and said first control disc.

3. A device as claimed in claim 2 wherein said control member is arranged to slide along an essentially straight slot defined a casing which defines a structural support member of the device.

4. A device as claimed in claim 2 wherein said control member comprises a pivotal lever, said pivotal lever being arranged to support said first control shaft in a manner wherein the axis thereof is movable along an arcuate path, said arcuate path being arranged to change the TDC position of said first piston as the stroke of the first piston is changed with the change in displacement between the axes of said first drive disc and said first control disc.

5. A device as claimed in claim 1 wherein said first piston defines a first variable volume chamber in said first cylinder, and which further comprises:

valve means for controlling fluid communication between said first variable volume chamber and a passage associated with said cylinder, said valve means comprising:

a cam shaft, said cam shaft having a pulley disposed thereon for synchronous rotation therewith;

a drive pulley, said drive pulley being disposed on said first drive shaft for synchronous rotation therewith;

a flexible belt operatively interconnecting said drive pulley and the pulley disposed on said cam shaft, said flexible belt including a predetermined amount of slack;

guide rollers means for tensioning said belt in a manner which takes up said slack and establishes a drive connection between the two pulleys, said guide roller means being movable and operatively connected to said control device in manner to be displaced with respect to said drive pulley and the pulley disposed on said cam shaft, in a manner which causes the cam shaft to undergo a change in angular position and change the timing of said valve means.

6. A device as claimed in claim 1 further comprising:

a second piston, said second piston being reciprocatively disposed in a second cylinder;

a second connecting rod, said second connecting rod being connected at a first end to said second piston;

a second drive disc, said second drive disc being connected to a second drive shaft for synchronous rotation therewith;

means defining a guide slot in said second drive disc which extends diametrically across a first face of said second drive disc;

a second control disc, said second control disc being connected with a second control shaft for synchronous rotation therewith;

means defining a guide slot in said second control disc which extends diametrically across a face of said second disc;

a third slider, said third slider being slidably received in the guide slot formed in said second drive disc;

a fourth slider, said fourth slider being slidably received in the guide slot formed in said second control disc;

a second pin, said second pin being operatively connected to a second end of said second connecting rod and fixedly connected to said third and fourth sliders, said third and fourth sliders being connected to the axial ends of said pin and arranged to extend in first and second directions, said first and second directions being arranged at right angles with respect to one and other;

said second control shaft being operatively connected with said control device in manner wherein the rotational axis of said second control disc is displaced with respect to the axis of said second drive disc synchronously and by the same amount as the dispacement of the axis of said first control disc with respect to said first drive disc.

7. A device as claimed in claim 6 further comprising a third and fourth pistons, said third and fourth pistons being reciprocatively disposed in third and fourth cylinders respectively;

third and fourth connecting rods, said third and fourth connecting rods being connected at their respective first ends to said third and fourth pistons, respectively;

third and fourth drive discs, said third and fourth drive disc being connected to a third and fourth drive shafts respectively for synchronous rotation therewith;

means defining guide slots in said third and fourth drive discs which guide slots extend diametrically across the faces of said third and fourth drive discs;

a third and fourth control discs, said third and fourth control discs being connected with third and fourth control shafts, respectively, for synchronous rotation therewith;

means defining guide slots in said third and fourth control discs which slots extend diametrically across faces of said third and fourth discs;

fifth and seventh sliders, said fifth and seventh sliders being slidably received respectively in the guide slots formed in said third and fourth drive discs;

sixth and eighth sliders, said sixth and eighth sliders being slidably received respectively in the guide slots formed in said third and fourth control discs;

third and fourth pins, said third and fourth pins being operatively connected to the second ends of said third and fourth connecting rods respectively, each of said third and fourth pins being fixedly connected at their axial ends to said fifth and sixth sliders and said seventh and eighth sliders respectively, said fifth and sixth and said seventh and eighth sliders being arranged to extend respectively in first and second directions, said first and second directions being arranged at right angles with respect to one and other;

said third and fourth control shafts being operatively connected with said control device in manner wherein the rotational axes of said third and fourth control disc are displaced with respect to the axes of said third and fourth drive discs synchronously and by the same amount as the dispacement of the axis of said first control disc with respect to said first drive disc.

8. A device as claimed in claim 7
wherein said first, second third and fourth cylinders are arranged in a rectangular configuration;
wherein the first and second drive shafts are alinged and said third and fourth drive shafts are alinged, the alinged third and fourth drive shafts being arranged in parallel with said alinged first and second drive shafts; and which further comprises:

an input/output shaft which is in drive connection with said first, second, third and fourth drive shafts, the arrangement being such that when said first and third piston assume their TDC positions, said second and fourth piston assume their BDC position.

9. A device as claimed in claim 8 wherein said control device comprises:

a hydraulic cylinder in which a hydraulic piston is disposed;

a rack which is operatively connected to said hydraulic piston;

pivotal a sector gear which is meshes with said rack and which supports said first and second control shafts;

a pivotal lever, said pivotal lever being connected with said sector gear by way of linkage and in manner wherein said sector gear pivots said pivotal lever synchronously pivots, said pivotal lever supporting said third and fourth control shafts.

10. A device as claimed in claim 9 wherein said rack is formed with a slot through which said input/output shaft extends, said slot being dimensioned so that movement of said rack can occur without contact with said input/output shaft.

* * * * *